United States Patent [19]
Holland

[11] Patent Number: 5,540,474
[45] Date of Patent: Jul. 30, 1996

[54] FOLDING RAMP FOR TRUCKS

[76] Inventor: Richard T. Holland, 38 Oak Grove Rd., Goose Creek, S.C. 29445

[21] Appl. No.: 492,706

[22] Filed: Jun. 20, 1995

[51] Int. Cl.⁶ .................................................. B62D 33/03
[52] U.S. Cl. ............................................ 296/61; 414/537
[58] Field of Search ........................... 296/61, 57.1, 51, 296/50; 414/537

[56] References Cited

U.S. PATENT DOCUMENTS

| | | | |
|---|---|---|---|
| 3,339,968 | 9/1967 | Hall | 296/61 |
| 3,510,015 | 5/1970 | Roshaven | 296/61 X |
| 3,642,156 | 2/1972 | Stenson | 296/61 X |
| 3,713,553 | 1/1973 | Curtis et al. | 296/61 X |
| 3,976,209 | 8/1976 | Burton | 296/61 X |
| 4,735,454 | 4/1988 | Bernard | 296/61 |
| 4,795,304 | 1/1989 | Dudley | 296/61 X |
| 4,884,838 | 12/1989 | Slater | 296/61 X |
| 5,273,335 | 12/1993 | Belnap et al. | 296/61 |
| 5,287,579 | 2/1994 | Estevez, Jr. | 296/61 X |
| 5,312,149 | 5/1994 | Boone | 296/61 |

*Primary Examiner*—Joseph D. Pape
*Attorney, Agent, or Firm*—B. Craig Killough

[57] ABSTRACT

A ramp is provided for use with vehicles having tailgates. The ramp is attached to the tailgate. The ramp is capable of folding into a bed of the vehicle and against the tailgate when not in use, and is folded away from the vehicle and the tailgate to extend toward the ground or other loading surface for use. A hinge controls the movement of the device relative to the tailgate of the vehicle to allow the device to be pivoted into position for use, and to be pivoted into the storage position against the tailgate.

11 Claims, 3 Drawing Sheets

FOLDING RAMP FOR TRUCKS

FIELD OF THE INVENTION

This invention relates to ramps generally, and is more particularly directed to a folding ramp which is attached to a tailgate of a truck.

BACKGROUND OF THE INVENTION

Trucks are characterized by loading areas, or beds, which are generally positioned on a rear section of the truck. Truck beds typically have a gate which is generally positioned on the end of the truck, and which is known as a tailgate or end gate. This tailgate is rotated from a vertical position to a horizontal position, so as to open the tailgate to permit easier loading of cargo into the bed of the truck.

Frequently, it is desirable to use a loading ramp in conjunction with loading cargo into a truck bed. Ramps allow wheeled devices, such as dollies or hand trucks to be pushed or pulled up the ramp. Motorized vehicles, such as motorcycles, may also be easily loaded with ramps.

Various ramp devices are shown in the prior art. Many of these devices attach to the rear of the truck or to the tailgate, and may be repositioned relative to the tailgate when not in use.

SUMMARY OF THE PRESENT INVENTION

The present invention is a ramp which is attached to a tailgate of truck. More specifically, the ramp is attached to the tailgate by means of a hinge. The hinge allows the ramp to be folded relative to the tailgate for storage when the ramp is not in use. When the tailgate is closed, and is in a vertical position, the ramp is pivoted to a position so that it rests inside the truck bed and against the tailgate. When the tailgate is open, or pivoted to a generally horizontal position, the ramp is pivoted away from the tailgate by means of the hinge so as to contact the ground or loading surface, thereby providing a loading ramp.

The ramp will usually have multiple sections which are hinged relative to each other to allow folding. Each section has a length and width which will allow the sections to be folded flat against the tailgate and inside of the truck bed for storage.

DESCRIPTION OF THE PREFERRED EMBODIMENT

Figure 1:
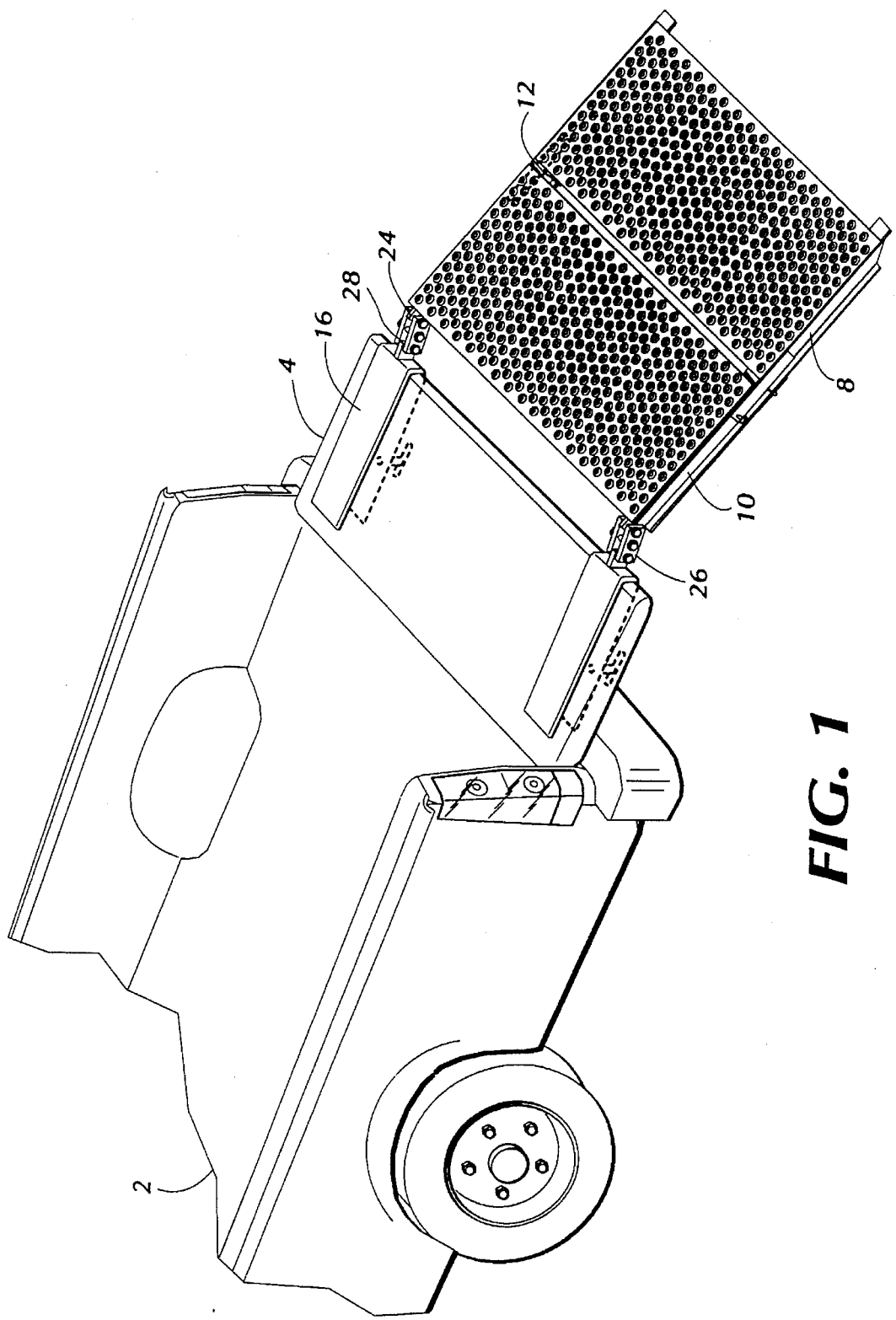
FIG. 1 is a perspective view of the loading ramp attached to a tailgate of a truck.

Referring now to the drawing figures, FIG. 1 shows the ramp attached to a tailgate of a truck. The tailgate 4 is attached to the bed 2 of a truck. The ramp is folded away from the open tailgate of the truck and is in position for use.

In the preferred embodiment, the loading ramp has two sections. Each section is generally rectangular when viewed from above. The top surface of each section is relatively flat, so that the section may be described as a plane. Accordingly, a generally rectangular, planar first section and a generally rectangular, planar second section are shown.

Figure 2:
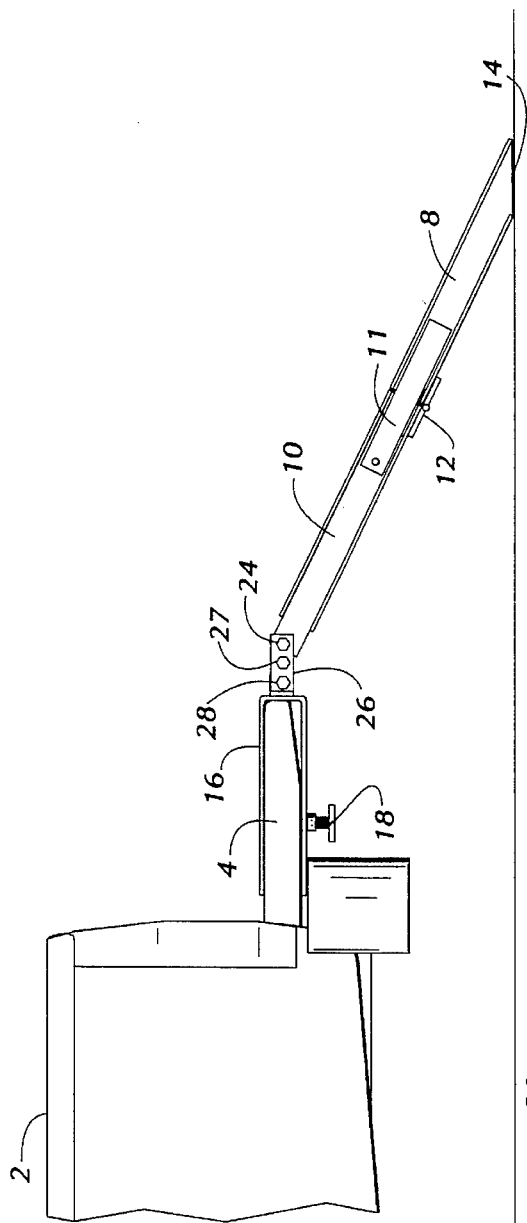
FIG. 2 is a side elevation of the loading ramp mounted to the tailgate of the truck, with the ramp folded away from and extending away from the truck and in position for use.
Figure 4:
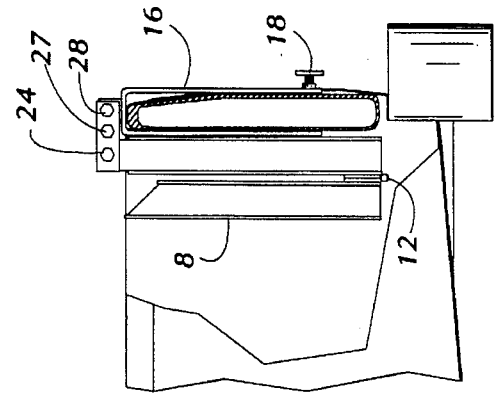
FIG. 4 is a side elevation with the bed of the truck partially cut away to show the final position of the ramp folded against the tailgate and inside the bed of the truck.
Figure 5:
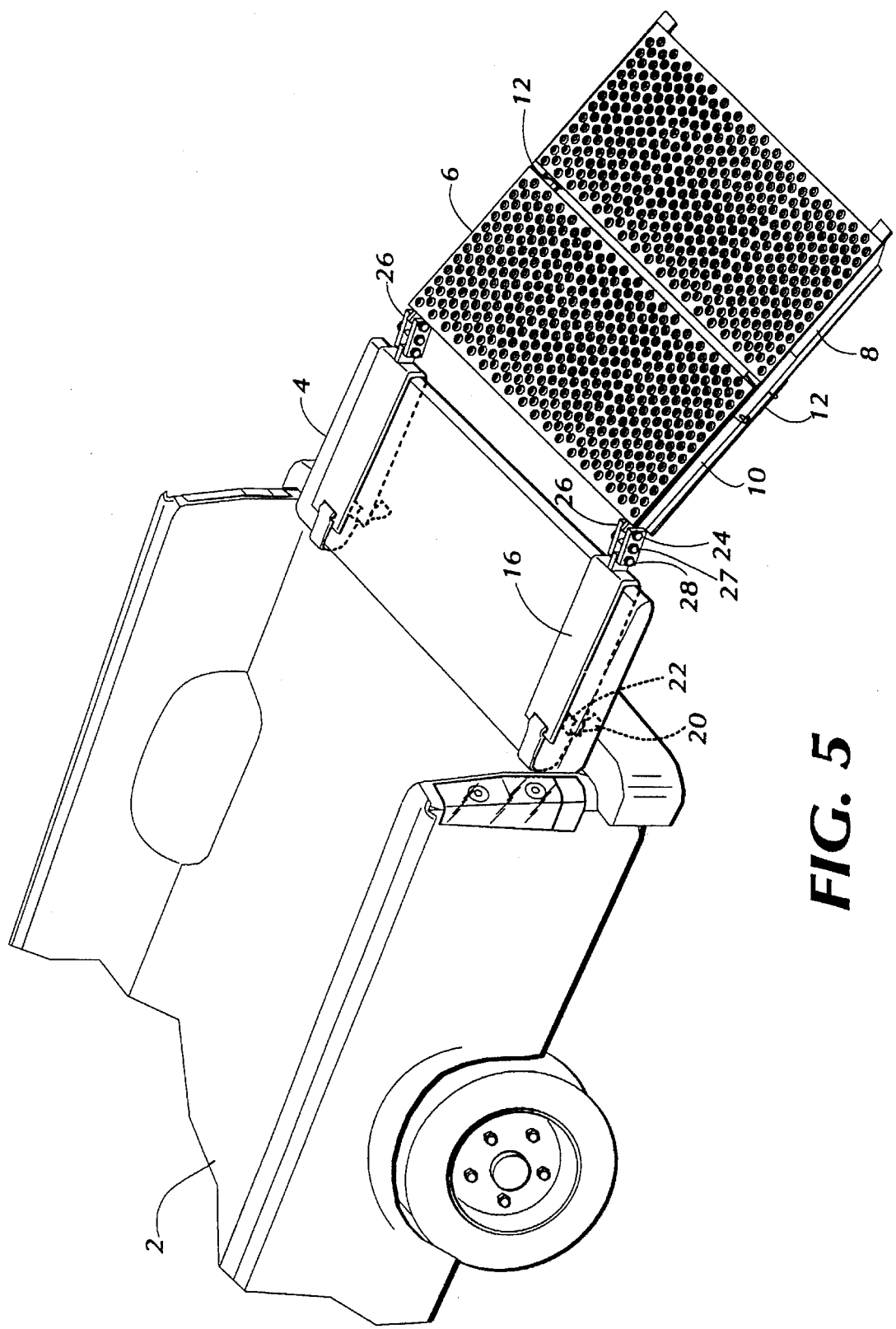
FIG. 5 is a perspective view of the ramp showing an additional embodiment of the clamping means.

The first section 8 and the second section 10 of the loading ramp are joined by a hinge 12. The hinge could be any commonly known type of hinge, or a series of hinges. The hinge, or multiple hinges, are described herein as a hinge means. The hinge means allows the first section and the second section to pivot relative to each other for storage within the bed of the truck, as shown in FIG. 4, and allow extension of the sections for use as shown in FIGS. 1, 2 and 5. Virtually any hinge or other pivoting structure which will allow the first section and the second section to pivot relative to each other from the position shown in FIG. 2 to the positions shown in FIGS. 3 and 4 may be used.

The top plane of the ramp may be provided with a non-skid surface. A first section, or the section which joins the ground or other loading surface when the ramp is extended, may be provided with an angled leading edge 14.

The first section and the second section which comprise the ramp are attached to the tailgate 4 of the truck. The ramp is attached to the tailgate of the truck by a clamping means. It is preferred that the clamping means comprise a structure which allows easy removal of the ramp from the truck.

The first embodiment of the clamping means is shown in FIG. 1. This clamping means 16 is a saddle-clamp. The saddle-clamp comprises a generally U-shaped structure which receives the tailgate into the "U" formed by the clamp. In the preferred embodiment, two saddle clamps are provided, with one of the saddle clamps positioned near each edge of the ramp structure as shown. It is desired to keep the clamp away from the center of the tailgate, so that the clamp does not interfere with the movement of cargo or material handling devices along the ramp and tailgate.

In the first embodiment shown, the saddle clamp is secured by a set screw. The set screw 18 is positioned on the outside of the tailgate, so that the set screw does not interfere with the movement of cargo when the tailgate is open. Other means for securing the clamp could be used. An additional embodiment is shown in FIG. 5. An adjustable belt 20 is threaded through loops formed in the ends of the U of the clamping means. The belt provides an adjustment means 22 for tailgates of various dimensions.

Figure 3:
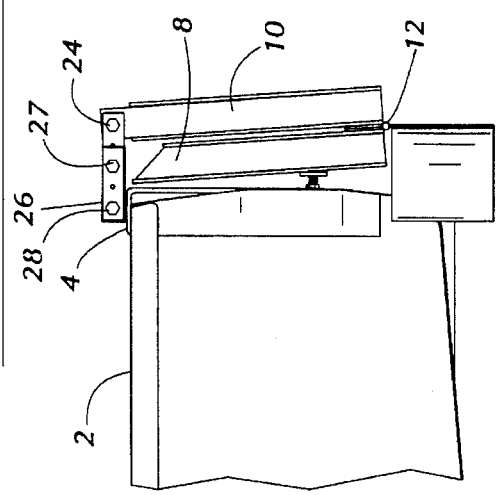
FIG. 3 is a side elevation showing an initial folding position of the ramp relative to the tailgate.

It is a goal of the present invention to allow a ramp which may be pivoted from the position for use as shown in FIG. 2 to the position shown in FIG. 4. As shown in FIG. 4, the ramp is folded against the tailgate of the truck and within the bed of the truck. By folding the ramp in sections against, and generally parallel to, the tailgate, a minimum of space is taken from the loading capacity of the bed of the truck. At the same time, it is preferred that the ramp is stored within the bed of the truck, so that the ramp does not present a safety hazard from its presence outside the bed of the truck, including the possibility of accidental unfolding or extension of the ramp. However, the structure of the present device allows the ramp to be stored outboard of the truck bed if necessary, as shown in FIG. 3.

To achieve the goals of the present invention as set forth above, it is necessary to attach the first section and second section which form the ramp to the clamping means by means of a hinge. This hinge must permit rotation of the ramp relative to the clamping means.

Hinge 26 joins the ramp to the clamping means as shown in the drawing figures. The second section is attached to the hinge. The attachment is by means of a pivotal mounting 24 which allows the second section to fully rotate relative to the hinge, without being limited by the pivotal mounting. The second section can pivot from the position shown in FIG. 3 to the position shown in FIG. 4 about the pivotal mounting. The only limitation on the rotational movement of the second section about the hinge is due to the presence of the tailgate, and not due to the pivotal mounting.

The clamping means is attached to hinge 26. The clamping means is attached by connection to an additional pivotal mounting 28. The pivotal mounting 28 allows full rotation of the hinge relative to the clamping means, so that the hinge extends generally horizontally when the ramp is extended for use as shown in FIG. 2.

In use, the device is attached to a tailgate of a truck. The clamping members receive the tailgate, and are secured against the tailgate. The tailgate is placed in the open, or in the generally horizontal position. The first section and the second section are positioned so that the top surface of each section is in approximately the same plane, with the leading edge 14 of the first section resting against the ground or other loading surface. The loading ramp is then in position for use. FIG. 1. After use, the first section is pivoted relative to the second section so that the top surfaces face each other and are generally in the same plane. The top surface of the first section and the top surface of the second section may be in contact with each other. The ramp is then rotated relative to the clamping means by means of hinge 26. The ramp may be rotated to the position of FIG. 4, and tile tailgate closed, for storage of the ramp means when not in use. The first section, the second section, and the tailgate are generally parallel to each other.

It is noted that the first section, the second section, and the tailgate are relatively the same height and width. The lower edges of the first section and the second section, when positioned as in FIG. 4, will generally not extend as low as the bottom of the tailgate. However, the top edge of the second section may extend above the tailgate as shown in FIG. 4, for attachment to the hinge. In summary, it is desirable that each section be as large as possible. However, in general terms, the first section and the second section cannot be larger than the tailgate, so that storage of the ramp, with the first section and the second section generally parallel to the tailgate and within the bed of the truck, is achieved by the invention.

Typically, the ramp will be folded inside the bed of the truck as shown in FIG. 4, however, if the ramp cannot be folded inside the bed of the truck, due to the presence of cargo, or for other reasons, the ramp may be positioned outside the bed of the truck, and outboard of the tailgate, as shown in FIG. 3. To configure the ramp as shown in FIG. 3, it is necessary to extend the length of the hinge 26. As shown in FIG. 1, each side of the ramp has a hinge 26 which is comprised of two parallel members. One of the two parallel members may be taken from each hinge, and by means of fastener 27, joined end to end with the remaining member to provide the hinge with the additional length necessary to position the hinge and the ramp as shown in FIG. 3. An alternative structure to that shown in the drawing figures is a hinge which is telescoping, with a pin which limits the travel of the telescoping hinge as desired. Either by placing the two members of each hinge end to end, or by providing telescoping hinges, additional length may be provided to allow the tailgate to be placed in the outboard position of FIG. 3. A plate 11 may be inserted and attached within the channel of first section 8 and second section 10, to prevent undesired folding of the ramp sections, and to supply additional structural integrity and rigidity to the device as used.

What is claimed is:

1. A loading ramp for vehicles having tailgates, comprising:
   a. generally rectangular, planar ramp means;
   b. clamping means which attaches to a tailgate of a vehicle; and
   c. a hinge which attaches said ramp means to said clamping means, wherein said hinge is attached to said ramp means by a first pivot point which allows said ramp means to rotate about said pivot point, and said hinge is connected to said clamping means by a second pivot point which allows said hinge to rotate relative to said clamping means.

2. A loading ramp for vehicles having tailgates, comprising:
   a. a first ramp section;
   b. a second ramp section;
   c. a first hinge for connecting said first ramp section and said second ramp section, wherein said first ramp section pivots about said first hinge relative to second ramp section, and a top plane of said first ramp section is pivoted to a position which is generally in the same plane as a top plane of said second ramp section, and said top plane of said first ramp section is pivoted to a position wherein a bottom surface of said first ramp section is between said top plane of said first ramp section and said top plane of said second ramp section;
   d. clamping means which attaches to a tailgate of a vehicle; and
   e. a second hinge which attaches said second ramp section to said clamping means, wherein said second hinge is attached to said second ramp section by a first pivot point which allows said first ramp section and said second ramp section to rotate about said pivot point, and said second hinge is connected to said clamping means by a second pivot point which allows said second hinge to rotate relative to said clamping means.

3. A loading ramp for vehicles having tailgates as described in claim 2, further comprising a tailgate which is pivotally attached to a vehicle, and wherein said first ramp section and said second ramp section each have a height which is less than a corresponding height of said tailgate, and wherein said first ramp section and said second ramp section have a width which is less than a corresponding width of said tailgate.

4. A loading ramp for vehicles having tailgates as described in claim 1, wherein said clamping device comprises a clamp having generally parallel members, with one of said generally parallel members positioned on one side of a tailgate, and a remaining generally parallel member positioned on an opposite side of said tailgate.

5. A loading ramp for vehicles having tailgates as described in claim 2, wherein said clamping device comprises a clamp having generally parallel members, with one of said generally parallel members positioned on one side of a tailgate, and a remaining generally parallel member positioned on an opposite side of said tailgate.

6. A loading ramp for vehicles having tailgates as described in claim 3, wherein said clamping device comprises a clamp having generally parallel members, with one of said generally parallel members positioned on one side of said tailgate, and a remaining generally parallel member positioned on an opposite side of said tailgate.

7. A loading ramp for vehicles having tailgates, comprising:

a. a first ramp section;

b. a second ramp section;

c. a first hinge for connecting said first ramp section and said second ramp section, wherein said first ramp section pivots about said first hinge relative to second ramp section, and a top plane of said first ramp section is pivoted to a position which is generally in the same plane as a top plane of said second ramp section, and said first ramp section and said second ramp second are pivoted to a position wherein said first ramp section, said second ramp section and a tailgate of a vehicle are in a generally parallel relationship;

d. clamping means which attaches to said tailgate; and e. a second hinge which attaches said second ramp section to said clamping means, wherein said second hinge is attached to said second ramp section by a first pivot point which allows said first ramp section and said second ramp section to rotate about said pivot point, and said second hinge is connected to said clamping means by a second pivot point which allows said second hinge to rotate relative to said clamping means.

8. A loading ramp for vehicles having tailgates as described in claim 7, wherein said first ramp section and said second ramp section each have a height which is less than a corresponding height of said tailgate, and wherein said first ramp section and said second ramp section have a width which is less than a corresponding width of said tailgate.

9. A loading ramp for vehicles having tailgates as described in claim 7, wherein said clamping device comprises a clamp having generally parallel members, with one of said generally parallel members positioned on one side of a tailgate, and a remaining generally parallel member positioned on an opposite side of said tailgate.

10. A loading ramp for vehicles having tailgates as described in claim 2, wherein a length of said second hinge may be selectively increased and decreased.

11. A loading ramp for vehicles having tailgates as described in claim 7, wherein a length of said second hinge may be selectively increased and decreased.

\* \* \* \* \*